United States Patent
Schramm et al.

(10) Patent No.: US 8,080,891 B2
(45) Date of Patent: Dec. 20, 2011

(54) HYBRID BRAKING SYSTEM AND METHOD

(75) Inventors: Simon Herbert Schramm, München (DE); Christof Martin Sihler, Hallbergmoos (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/566,734

(22) Filed: Sep. 25, 2009

(65) Prior Publication Data

US 2010/0133823 A1 Jun. 3, 2010

(51) Int. Cl.
*F03D 9/00* (2006.01)
*H02P 9/04* (2006.01)
*F03B 15/06* (2006.01)

(52) U.S. Cl. .................. 290/44; 290/55; 415/4.1

(58) Field of Classification Search .............. 290/44, 290/55; 415/4.1; 318/370–373, 375, 382
See application file for complete search history.

(56) References Cited

U.S. PATENT DOCUMENTS

| | | | |
|---|---|---|---|
| 4,278,298 A * | 7/1981 | Sauka et al. ................ 303/3 |
| 4,283,092 A * | 8/1981 | Sauka et al. ................ 303/3 |
| 4,418,963 A * | 12/1983 | Sprockhoff ................ 303/3 |
| 4,490,093 A | 12/1984 | Chertok et al. ........... 416/26 |
| 4,550,372 A * | 10/1985 | Kahrs ...................... 303/152 |
| 4,613,282 A * | 9/1986 | Wood ....................... 416/36 |
| 4,659,284 A * | 4/1987 | Wood ....................... 416/36 |
| 4,664,596 A * | 5/1987 | Wood ....................... 416/32 |
| 5,137,417 A * | 8/1992 | Lund ...................... 415/4.1 |
| 5,327,647 A * | 7/1994 | Gurniak ................... 29/889 |
| 6,265,785 B1 * | 7/2001 | Cousineau et al. .......... 290/44 |
| 6,726,439 B2 * | 4/2004 | Mikhail et al. ........... 415/4.1 |
| 6,902,370 B2 * | 6/2005 | Dawson et al. ........... 415/4.1 |
| 6,927,626 B2 * | 8/2005 | Stanley ................... 330/128 |
| 7,183,665 B2 | 2/2007 | Bywaters et al. ........... 290/55 |
| 7,425,771 B2 | 9/2008 | Rivas et al. .............. 290/44 |
| 7,488,155 B2 * | 2/2009 | Barbu et al. .............. 416/1 |
| 7,508,089 B2 | 3/2009 | Guang et al. ............. 290/44 |
| 7,586,216 B2 * | 9/2009 | Li et al. ................. 307/151 |
| 7,632,070 B2 * | 12/2009 | Dawson et al. ........... 416/89 |
| 7,816,801 B2 * | 10/2010 | Guang et al. ............. 290/55 |
| 7,940,016 B2 * | 5/2011 | Donnelly et al. .......... 318/139 |
| 2004/0060026 A1 * | 3/2004 | Stanley ................... 716/10 |
| 2004/0197188 A1 * | 10/2004 | Drake .................... 415/4.1 |
| 2004/0253093 A1 * | 12/2004 | Shibata et al. ........... 415/4.1 |
| 2005/0034937 A1 * | 2/2005 | Agardy et al. ........... 188/72.9 |
| 2007/0166147 A1 * | 7/2007 | Merswolke et al. ........ 415/4.1 |
| 2007/0216163 A1 * | 9/2007 | Guang et al. ............. 290/44 |
| 2007/0268002 A1 * | 11/2007 | Guang et al. ............. 322/28 |
| 2007/0279815 A1 * | 12/2007 | Li et al. ................. 361/54 |
| 2008/0309090 A1 * | 12/2008 | Stern et al. .............. 290/55 |
| 2009/0081020 A1 * | 3/2009 | Caldwell ................ 415/4.1 |
| 2009/0167088 A1 * | 7/2009 | Gonzalez et al. ......... 307/60 |
| 2011/0169433 A1 * | 7/2011 | Lundell ................. 318/372 |

FOREIGN PATENT DOCUMENTS

JP 52118215 A * 10/1977
JP 2000179446 A 6/2000

* cited by examiner

*Primary Examiner* — Pedro J Cuevas
(74) *Attorney, Agent, or Firm* — Ann M. Agosti

(57) ABSTRACT

A wind turbine hybrid braking system is presented. The system includes a generator coupled to a main shaft of the wind turbine for generating and transmitting power. A mechanical brake is coupled to the main shaft for applying reaction torque upon braking of the wind turbine. The system further includes an electrical braking circuit coupled to the generator for acting in conjunction with the mechanical brake and dissipating active power via controlled switching.

19 Claims, 6 Drawing Sheets

HYBRID BRAKING SYSTEM AND METHOD

BACKGROUND

The invention relates generally to braking in turbines and, in particular, to hybrid braking in wind turbines.

Wind turbines have been used as a source of power for many years. Among the various operational parameters, speed control and emergency braking capability have particularly strong influences on the structural stability and longevity of the components within the wind turbine. Controlling the speed of a wind turbine rotor below its maximum limit is necessary in order to avoid the damaging effects of high velocity winds on the wind turbine and its supporting structure. Structural damage due to over-stressing the turbine blades and rotor can occur if the rotational speed of the wind turbine is allowed to increase without limit.

Typically, mechanical braking systems in wind turbines are configured to halt the turbines during an emergency or any other event that requires stopping the turbine. However, dynamic control and fast response are difficult to achieve in mechanical braking during operation of the turbine. Another approach includes deploying hydraulics to aero-brake devices wherein the blade tips are moved to counter the wind force during braking. In yet another approach, a mechanical braking scheme is implemented that allows the rotor blades to deflect backwards and in the direction of the wind flow under gusting wind conditions. This in turn alters the rotor blade pitch or angle of incidence to respond to wind conditions. To prevent damage or destruction to the wind turbine and other wind turbines when within a wind farm, a braking system must provide reliable braking and back-up braking systems.

However, such mechanical braking approaches as discussed above have certain disadvantages. All of these devices add significant cost and weight to the rotor blades and the overall drive train. Aero-brakes implementing dynamic wing tip brakes and associated hardware have low tolerance limits and increase design, manufacturing, and maintenance costs. Further, added weight increases the strain on the braking system. By implementing only mechanical braking during an emergency stop, dynamic torque components cannot be avoided. To handle such dynamic torque, the mechanical drive train has to be designed with adequate safety margins that add weight to the wind turbine structure. Furthermore, such mechanical brakes induce fatigue on gearboxes due to transient overload and dynamic torque components during emergency stops.

Therefore there is a need for an improved braking system.

BRIEF DESCRIPTION

Briefly, in one embodiment, a wind turbine hybrid braking system is presented. The system includes a generator coupled to a main shaft of the wind turbine for generating and transmitting power. A mechanical brake is coupled to the main shaft for applying reaction torque upon braking of the wind turbine. The system further includes an electrical braking circuit coupled to the generator for acting in conjunction with the mechanical brake and dissipating active power via controlled switching.

In another embodiment, a method to dampen dynamic torque on a shaft of a wind turbine is presented. The method includes, upon receipt of an emergency stop signal, simultaneously mechanically braking the shaft and activating a controllable switch of an electrical braking circuit to dissipate active power from the wind turbine in a power resistor of the electrical braking circuit.

In yet another embodiment, a hybrid braking system is presented. The system includes a mechanical brake coupled to a main shaft of a turbine and an electrical braking circuit having at least one semiconductor switch, a switching control circuit, and at least one power resistor for dissipating active power. The hybrid braking system further includes a controller for activating both the mechanical brake and the electrical braking circuit in response to an emergency stop signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

During operation of a wind turbine, various forces and moments induced by the wind act on the turbine's rotor shaft. For example, peak loads, sudden loading reversal, emergency stops, changing wind direction, and vibrations contribute to dynamic effect. One of the challenges in wind turbine design includes the turbine's overall dynamic stability. By considering only static conditions during design, life of drive train, gearbox and bearings in the wind turbines may be underestimated. Many technical faults or grid events tend to trigger an emergency stop that results in sudden deceleration of the rotor that induces heavy loading on the wind turbine. Traditionally, mechanical brakes are applied in response to emergency stops. Such brakes induce braking torque to the system with limited controllability and time lag, thus inducing large dynamic torque components and overloads during emergency stop events. Furthermore, torsional oscillations with high torque amplitude are induced on the rotor shaft. Certain embodiments of the invention propose a hybrid braking system to dampen the dynamic torque components and improve dynamic response of the overall braking system.

Figure 1:
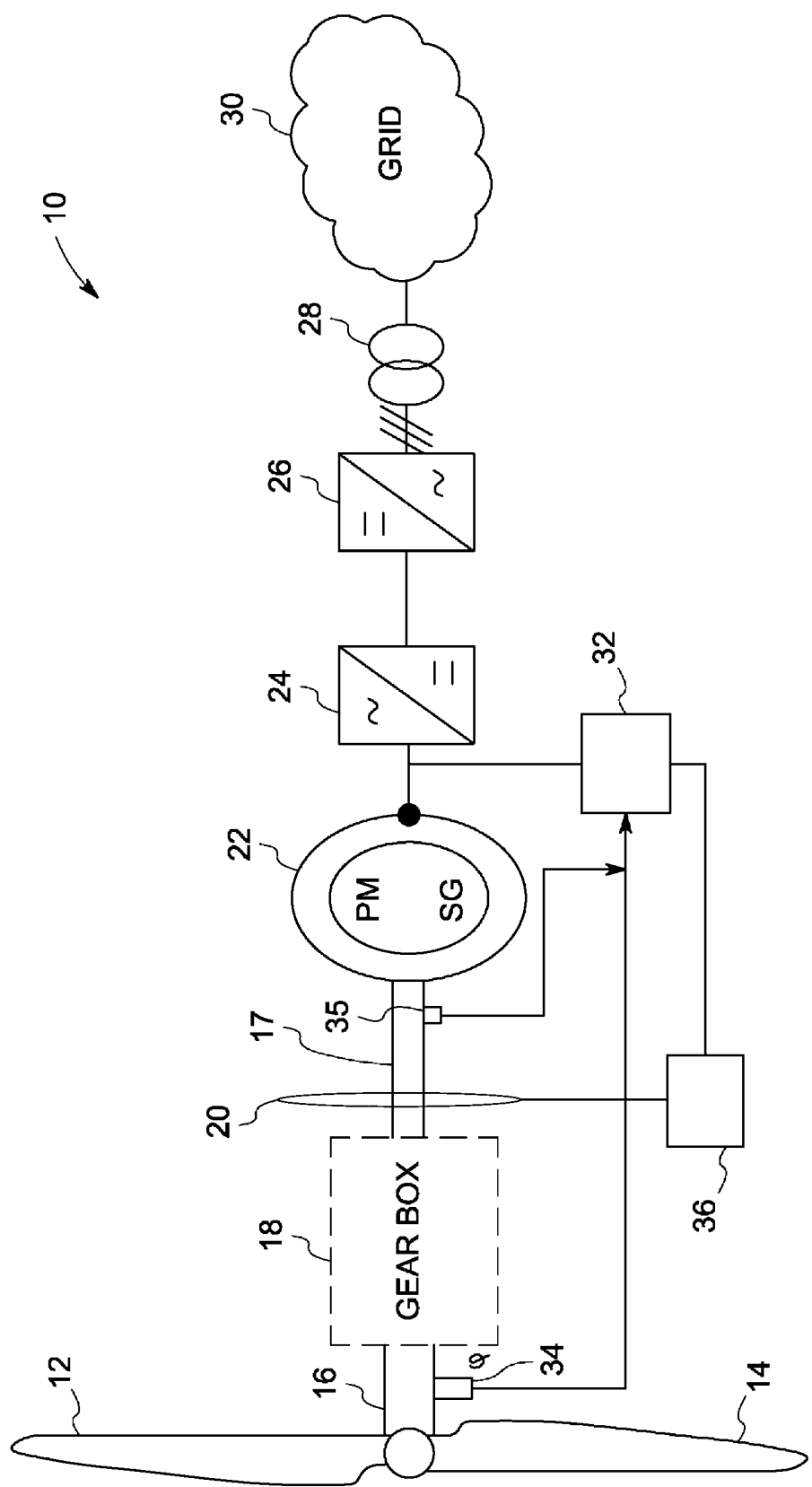
FIG. 1 is a block diagram of an exemplary wind turbine system implementing a hybrid braking system according to an embodiment of the invention.

FIG. 1 is a block diagram of an exemplary wind turbine system implementing a hybrid braking system according to an embodiment of the invention. The wind turbine 10 includes blades 12, 14 coupled to a main shaft 16. Further coupled to the main shaft are gearbox 18, mechanical brake 20, and generator 22. A rectifier 24, inverter 26, and transformer 28 are electrically coupled to the generator 22. The transformer 28 is configured to transmit power form the generator 22 to a grid 30. Optionally, one or more sensors 34, 35 are coupled to the main shaft 16. An electrical braking circuit 32 is coupled to an output side of the generator 22. A controller (or control system) 36 is coupled to the mechanical brake 20 and the electrical braking circuit 32.

In an exemplary operation of the wind turbine system 10, wind exerts force on the blades 12, 14 that in turn rotate the main shaft 16. The gearbox 18 is configured to adjust the speed of the main shaft to match with the operational speed of the generator 22. Mechanical brake 20 is coupled to the rotor shaft and configured to apply reaction torque during braking. As used herein, the terms "rotor shaft" and "main shaft" are interchangeable. Generator 22 is configured to generate an AC power that is converted to DC power via the rectifier 24. Inverter 26 is configured to convert the DC power back to grid compatible AC power. Transformer 28 is configured to feed power at appropriate voltage levels to the grid 30. Sensor 34, 35 is configured to measure one or more mechanical parameters of the shaft such as rotational speed and/or torque. In an exemplary embodiment, the controller 36, upon receiving an emergency stop signal, is configured to activate the mechanical brake and the electrical braking circuit simultaneously.

Figure 2:
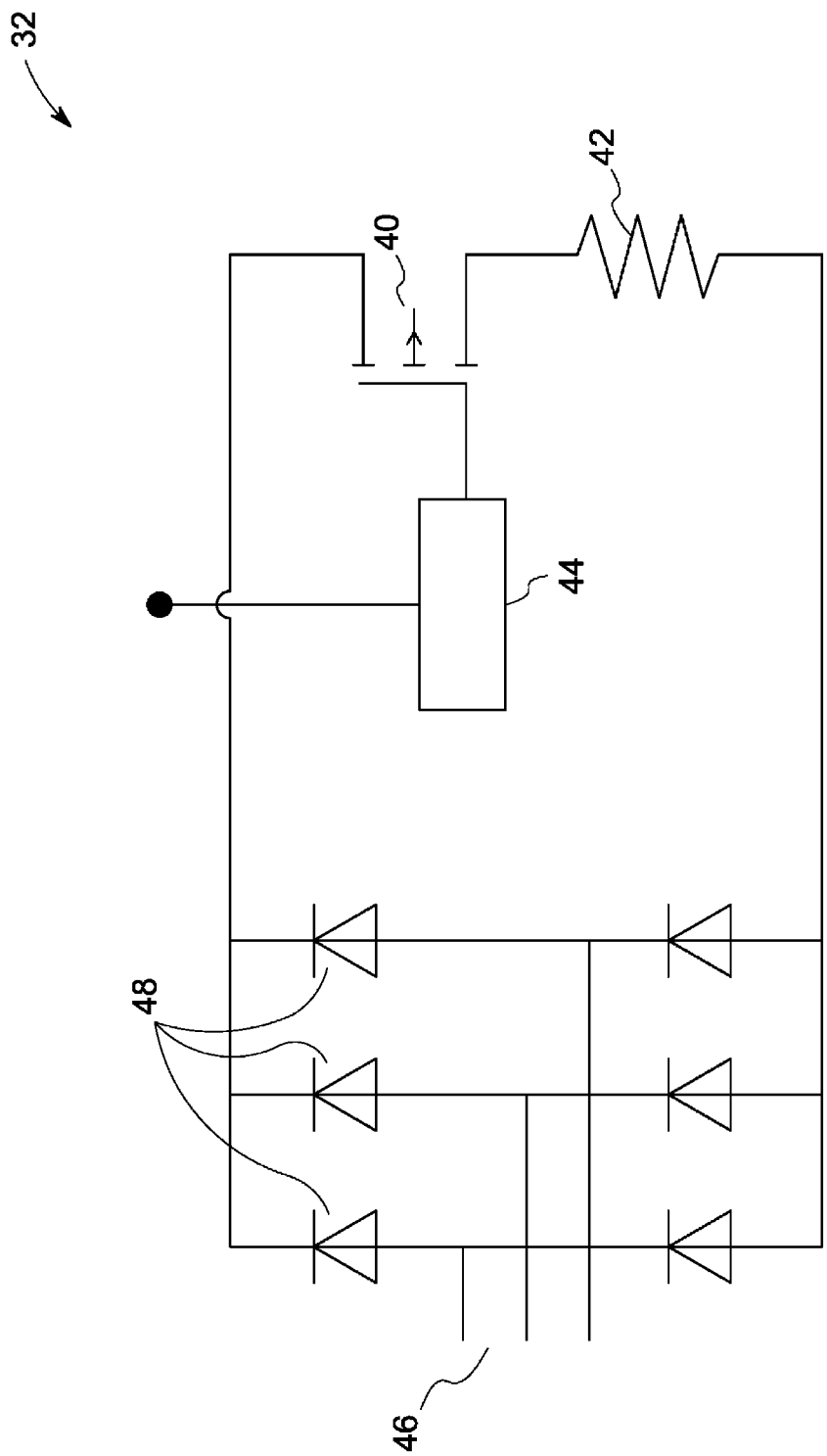
FIG. 2 is an embodiment of an electrical braking circuit for use in the embodiment of FIG. 1.

FIG. 2 is one embodiment of an electrical braking circuit useful for the embodiment of FIG. 1. The electrical braking circuit 32 (or the dynamic braking circuit) includes at least one semiconductor switch 40 coupled to at least one power resistor 42. Non limiting examples of the semiconductor switch include an insulated-gate bipolar transistor (IGBT), a metal-oxide-semiconductor field-effect transistor (MOSFET), an integrated gate commutated thyristor (IGCT), a thyristor, or combinations thereof. Power resistor construction may include but is not limited to steel wire windings or metal alloy strips. Current handling capacity and resistance value (ohms) of such resistors may be designed as per system requirements. The thermal storage capacity of the resistor is typically below the value of the rotational energy stored in the rotor. In one embodiment, the power resistor is configured for a thermal capacity of about less than 5 percent of the design value of the energy to be dissipated in the mechanical brake. A switching control circuit 44 is coupled to the semiconductor switch 40 and configured to turn on or turn off the switch 40. The controller 36 as referenced in FIG. 1 is coupled to the switching control circuit 44 and configured to activate the dynamic braking simultaneously with the mechanical braking.

In an exemplary operation, the electrical braking circuit 32 is activated in response to an emergency stop signal. Controller 36 (FIG. 1) activates switching control circuit 44. A diode bridge 48 may be coupled between the generator (via terminals 46) and the semiconductor switch 40. In response to the controller signal, active power from the generator is transferred to the resistor 42 via the diodes 48 and the switch 40. Switching of switch 40 controls the magnitude and duration of power dissipated. Alternatively, the diode bridge 48 may be replaced with a thyristor, an insulated-gate bipolar transistor (IGBT), an integrated gate commutated thyristor (IGCT), or a metal-oxide-semiconductor field-effect transistor (MOSFET) for controlled firing.

Figure 3:
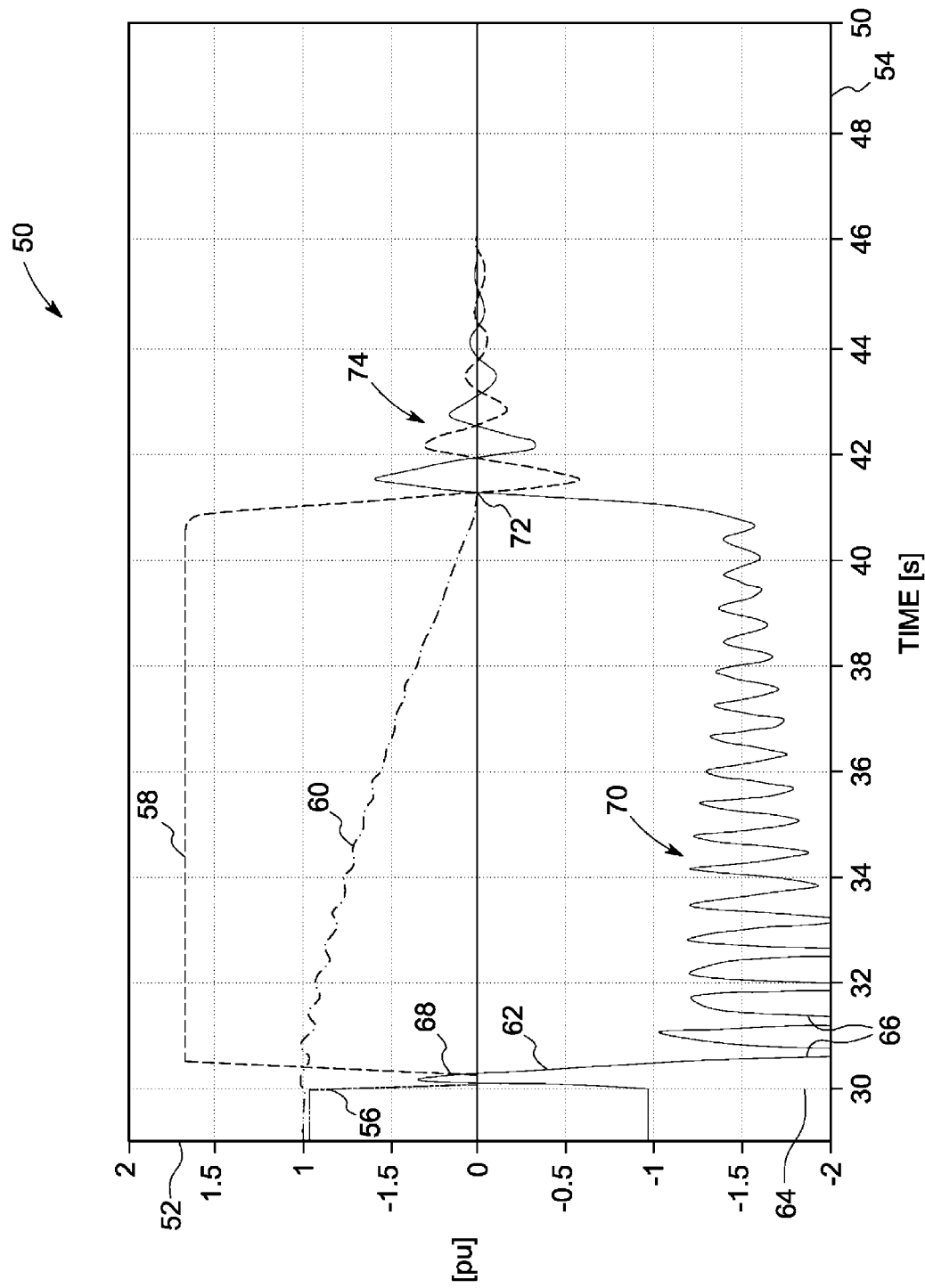
FIG. 3 is simulated graph of torque vs. time for a main shaft of a wind turbine implementing only mechanical braking.

FIG. 3 is simulated graph 50 of torque vs. time for a main shaft of a wind turbine implementing only mechanical braking. The ordinate axis represents torque and speed 52 converted to per unit scale, and the abscissa axis represents time 54 measured in seconds. Multiple profiles such as electrical power output 56, braking torque 58, rotational speed 60, and main shaft torque 62 are illustrated. Electrical power output is measured at the output terminals of the power converter. Braking torque, rotational speed, and main shaft torque are measured at the low speed shaft between the gearbox and the wind turbine. In an exemplary embodiment, at an instant 64, an emergency stop signal is triggered. Such emergency stop may occur due to a mechanical or electrical fault or grid fault or any other inoperable condition in the wind turbine system.

In response to the emergency stop signal, the rectifier 24 as referenced in FIG. 1 is switched off (by, for example, turning the gate signals to zero and triggering a DC link crowbar (not shown) for converter protection). Such loss of load on the generator results in a change in shaft torque to almost zero, followed by a peak dynamic torque as a result of the mechanical brake acting as a step load on the mechanical shaft, as illustrated by peak 66 in the main shaft torque profile 62. Such peaks (66) are in response to step load characteristic of the mechanical brake (from zero to maximum brake torque within short interval of time). Further, transient peaks 66 may reach values of above 2 per unit and may significantly influence failure rates of the mechanical components coupled to the shaft. The rotational speed 60 starts to decrease after reaction torque is fully applied by the mechanical brake 68. Mechanical braking, apart from adding braking torque to the system, results in dynamic torque oscillations as illustrated by the reference numeral 70. The dynamic torque oscillation is the result of step load applied by the mechanical brake. The reaction torque before emergency stop added by the generator is variable (dependent on the load level of the turbine), whereas the brake torque is a function of rotational speed of high-speed shaft 17. There is a mismatch between the reaction torque and the braking torque which results in a step load on the mechanical system. Such a step response excites all frequencies and causes resonant frequencies which result in dynamic torque oscillations at natural frequencies of the mechanical drive train. Presently contemplated embodiments are designed to reduce peak dynamic torque and torque oscillations that may damage mechanical components coupled to the shaft such as the gearbox and couplings on the generator and the turbine.

Figure 4:
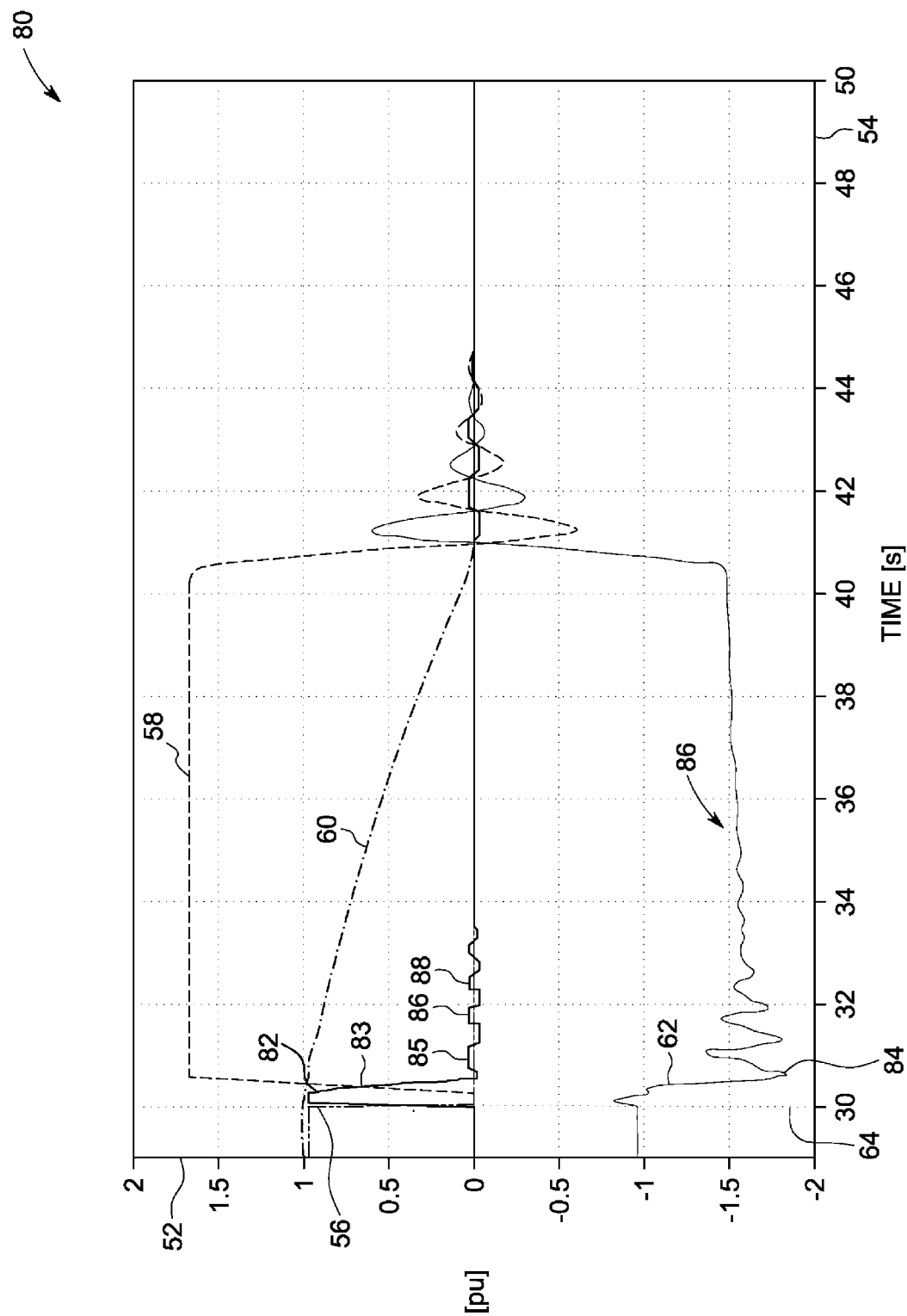
FIG. 4 is a simulated graph of torque vs. time for a main shaft of a wind turbine implementing hybrid braking according to an embodiment of the invention.

FIG. 4 is a simulated graph 80 of torque vs. time for a main shaft of a wind turbine implementing hybrid braking according to an embodiment of the invention. As used herein, "hybrid braking," refers to altering of the dynamic component of the total braking via the electrical braking circuit. The ordinate axis represents torque and speed 52 converted to per unit scale, and the abscissa axis represents time 54 measured in seconds. Multiple profiles such as electrical power output 56 of the converter, rotational speed 60, braking torque 58, and mechanical torque 62 on the low speed shaft are illustrated in graph 80. Further, a dynamic braking component activated during hybrid braking according to an embodiment is illustrated by the profile 82. In one embodiment, the power converter is cut off in response to emergency stop at instance 64, reducing the power output to zero as illustrated by profile 56. For sake of continuity of load on the generator, an electrical braking circuit (32 as referenced in FIG. 2) coupled to the output of the generator absorbs active power equivalent to the power supplied to the converter just before cut off. Profile 82 illustrates such active power load on the generator, activated in response to sudden loss of load due to the emergency stop. The electrical braking circuit has quick response and may be activated more quickly than the mechanical braking. Once the braking torque from the mechanical brake is activated, active power dissipated within the electrical braking circuit is reduced as illustrated by profile 83. By way of dissipating active power immediately after loss of load on the generator, the first transient peak is significantly reduced to about 1.8 per unit (as illustrated by profile 84) as compared to above 2 per unit when only mechanical braking was applied. Further to improve damping of torsional oscillations, power dissipated by the electrical braking circuit is continued after mechanical brake is fully activated as illustrated by reference numerals 85-88. Such synchronized power dissipation significantly reduces oscillations in torsional torque as illustrated by reference numeral 86.

Figure 5:
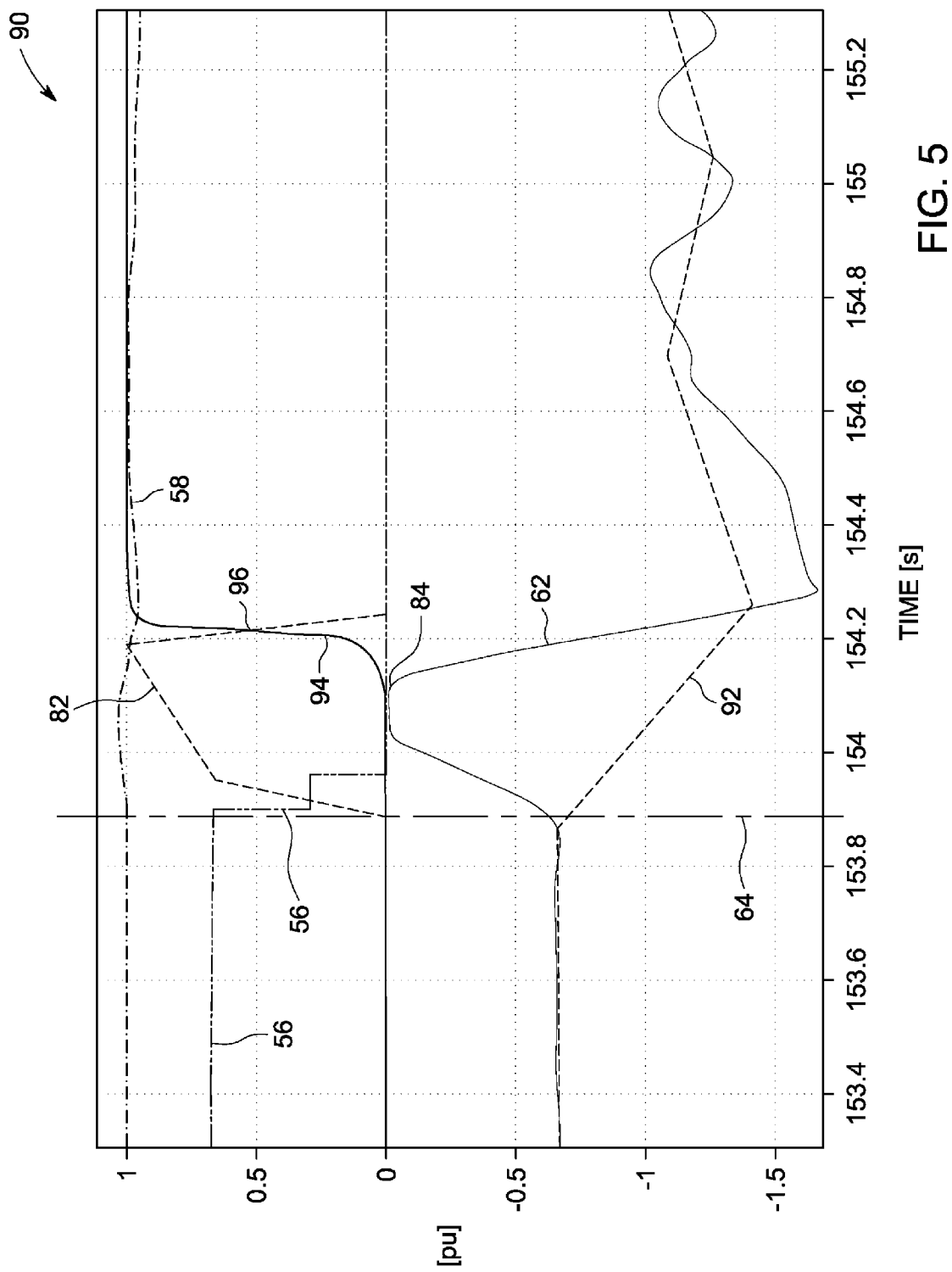
FIG. 5 is another graph of torque vs. time for a main shaft of a wind turbine implementing hybrid braking according to an embodiment of the invention.

FIG. 5 is another simulated graph of torque vs. time for a main shaft of a wind turbine implementing hybrid braking according to an embodiment of the invention. Graph 90 illustrates a detailed profile immediately after an emergency stop has occurred. The ordinate axis represents torque and speed 52 converted to per unit scale, and the abscissa axis represents time 54 measured in seconds with a resolution of about 0.2 seconds per division. In response to an emergency stop at instance 64, the electrical power of the converter is reduced to zero as illustrated by profile 56. Main shaft torque starts to decrease as a result of loss of load (92). Dynamic braking is activated in response to the emergency stop. Active power to be dissipated is approximately equal to the power output of the generator before load cut off. Profile 82 illustrates active power dissipated at the terminals of the generator. Once the mechanical brake is activated (94), the active power dissipated is reduced. Smooth transition 96 between braking torque and active power is achieved such that the maximum torque is limited to about 1.35 per unit, alternating around the steady state torque value of about 1.2 per unit with an amplitude maximum of about 0.15 per unit.

Figure 6:
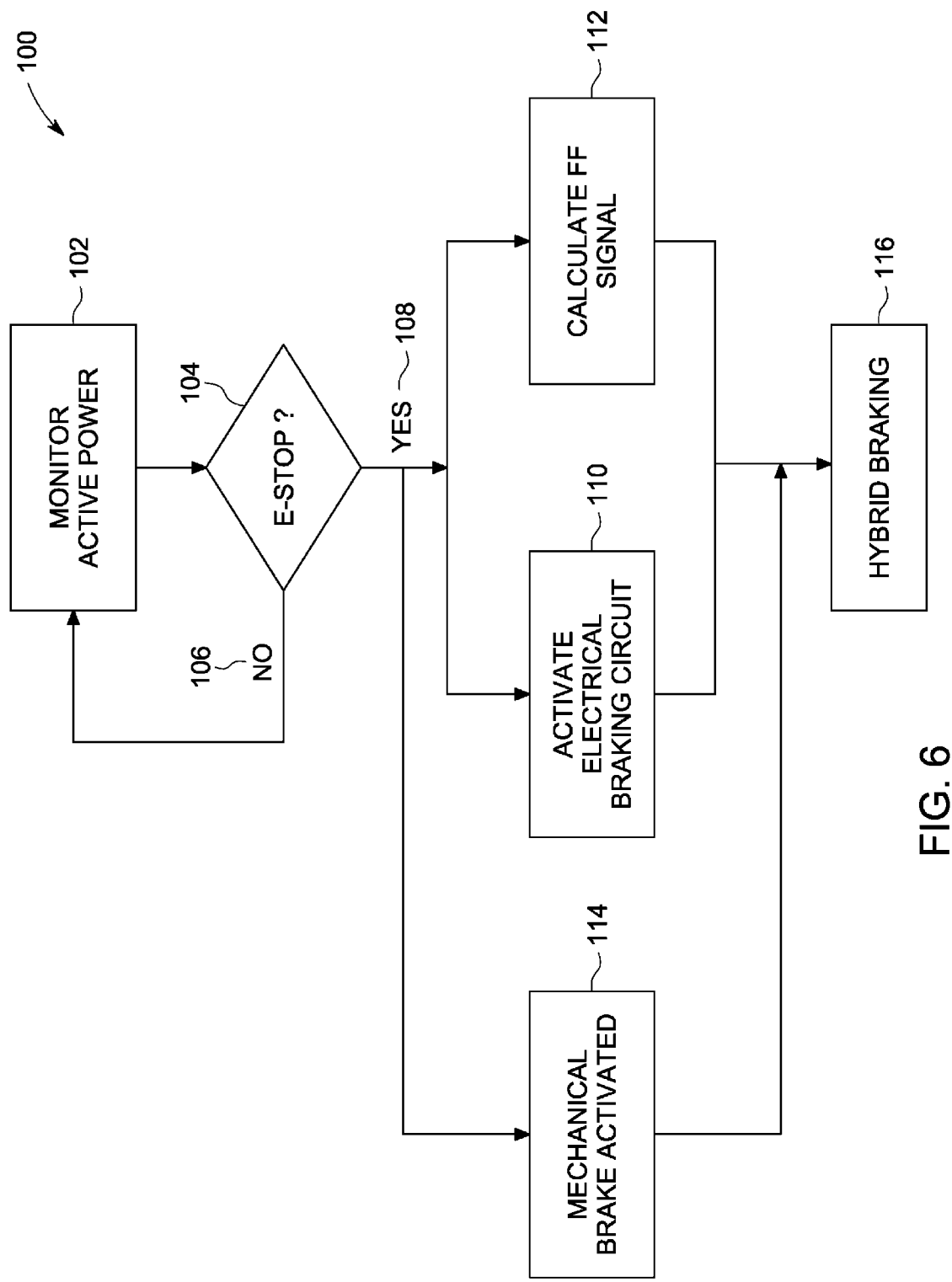
FIG. 6 illustrates an exemplary method of applying hybrid braking.

FIG. 6 illustrates an exemplary method of applying hybrid braking. The method 100 includes step 102 for monitoring active power output of the generator coupled to wind turbine. Step 104 includes monitoring whether an emergency stop event has occurred. If there is no emergency stop event (106), active power is continuously monitored. If there is emergency stop event (108), electrical braking circuit is activated at step 110. Simultaneously, the magnitude and duration of active power to be dissipated is computed in step 112. The mechanical brake is activated in step 114. Although they may be activated simultaneously, mechanical system response delay will typically result in the mechanical braking taking effect after the electrical braking. Once both dynamic braking and mechanical braking are simultaneously applied on the shaft, hybrid braking is active (step 116). As discussed above, such hybrid braking reduces peak transient torque and reduces torsional oscillations.

Advantageously, such hybrid braking systems do not add weight to the overall system and provides torsional mode torque damping during braking. Further, such hybrid braking systems includes a retrofit design for existing units. However hybrid dynamic braking as proposed in certain embodiments of the invention act with low response time and provide more dynamic control over torque acting on the shaft by controlled dissipation of active power. Reduced fatigue and improved lifetime of gearbox is achieved due to dampened dynamic torque components during emergency stops.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A hybrid braking system for a wind turbine, comprising:
    a mechanical brake coupled to a main shaft of a wind turbine for applying reaction torque upon braking of the wind turbine;
    an electrical braking circuit coupled to a generator of the wind turbine, the electrical braking circuit including a controllable switch; and
    a controller coupled to the mechanical brake and the electrical braking circuit, the controller configured to activate the electrical braking circuit simultaneously with the mechanical brake,
    wherein active power from the generator is transferred to the electrical braking circuit in response to a signal from the controller to the controllable switch of the electrical braking circuit.

2. The system of claim 1, wherein the electrical braking circuit is coupled to an output side of the generator.

3. The system of claim 1, wherein the electrical braking circuit further comprises at least one controllable semiconductor switch and at least one power resistor.

4. The system of claim 3, wherein the at least one semiconductor switch comprises an insulated-gate bipolar transistor (IGBT), a metal-oxide-semiconductor field-effect transistor (MOSFET), an integrated gate commutated thyristor (IGCT), a thyristor, or combinations thereof.

5. The system of claim 1, further comprising at least one sensor coupled to the main shaft.

6. The system of claim 5, wherein the sensor is configured to measure at least one mechanical parameter of the main shaft.

7. The system of claim 5, further comprising a controller for activating both the mechanical brake and the electrical braking circuit in response to an emergency stop signal.

8. The system of claim 7, wherein the controller is configured for causing the electrical braking circuit to damp a dynamic torque on the main shaft in response to the activation of the mechanical break.

9. A method to dampen dynamic torque on a shaft of a wind turbine using a hybrid braking system, the method comprising, upon receipt of an emergency stop signal, simultaneously mechanically braking the shaft and activating a controllable switch of an electrical braking circuit to dissipate active power from the wind turbine to a power resistor of the electrical braking circuit.

10. The method of claim 9, further comprising monitoring at least one mechanical parameter of the shaft.

11. The method of claim 10, wherein the mechanical parameter comprises at lease one of torque, rotational speed, or combinations thereof.

12. The method of claim 10, further comprising computing the amount of active power to be dissipated.

13. The method of claim 9, further comprising activating the controllable switch by way of a controller coupled to the electrical braking circuit.

14. A hybrid braking system comprising:
    a mechanical brake coupled to a main shaft of a wind turbine;
    an electrical braking circuit coupled to a generator of the wind turbine, the electrical braking circuit comprising:
        at least one semiconductor switch,
        a switching control circuit, and
        at least one power resistor for dissipating active power from the generator, and
    a controller coupled to the mechanical brake and the electrical braking circuit, the controller configured to activate the electrical braking circuit simultaneously with the mechanical brake in response to an emergency stop signal.

15. The system of claim 14, wherein hybrid braking is configured to reduce a torsional oscillation in the main shaft.

16. The system of claim 14, wherein the power resistor is configured for a thermal capacity of about less than 5 percent of design value of energy to be dissipated in the mechanical brake.

17. The system of claim 14 further comprising at least one sensor configured to measure at least one mechanical parameter of the main shaft.

18. The system of claim 17, wherein the at least one sensor is coupled to the switching control circuit.

19. The system of claim 17, wherein the at least one mechanical parameter comprises rotational speed, torque, or combinations thereof.

* * * * *